United States Patent [19]
Martens et al.

[11] Patent Number: 5,450,930
[45] Date of Patent: Sep. 19, 1995

[54] HEAVY DUTY ELECTRONIC BRAKE STROKE INDICATOR

[75] Inventors: Timothy F. Martens, Westland; Robert J. Hicks, Davisburg; Robert J. Hilding, W. Bloomfield, all of Mich.

[73] Assignee: MGM Brakes, Charlotte, N.C.

[21] Appl. No.: 164,396

[22] Filed: Dec. 9, 1993

[51] Int. Cl.⁶ .................................. F16D 66/00
[52] U.S. Cl. ..................... 188/1.11; 116/208; 324/207.2; 324/207.24; 340/454; 92/63
[58] Field of Search .............. 188/1.11, 170; 340/453, 340/454; 192/30 W; 60/534, 545; 92/5 R, 5 L, 130 A, 63-64, 168 B; 116/208; 91/1; 277/DIG. 4, 237 A; 303/113.4, 71; 324/207.2, 207.22, 207.24, 207.12; 338/32 H; 73/129, 121

[56] References Cited

U.S. PATENT DOCUMENTS

| | | |
|---|---|---|
| 2,873,436 | 2/1959 | Avrea . |
| 2,912,536 | 11/1959 | Hoch ........................... 200/82 D |
| 3,654,549 | 4/1972 | Maurer et al. .................. 92/5 R X |
| 3,730,056 | 5/1973 | Swander, Jr. ................... 92/63 X |
| 3,776,329 | 12/1973 | Hope et al. ..................... 188/1.11 |
| 3,808,593 | 4/1974 | Kopernik et al. ................ 340/454 |
| 4,188,605 | 2/1980 | Stout ............................... 338/32 H |
| 4,279,214 | 7/1981 | Thorn ............................. 116/208 |
| 4,364,305 | 12/1982 | Dalibout et al. ................. 188/170 |
| 4,471,304 | 9/1984 | Wolf ............................. 338/32 H |
| 4,583,071 | 4/1986 | Sebalos et al. .................. 188/1.11 |
| 4,642,603 | 2/1987 | Martinez, Jr. ................... 188/1.11 |
| 4,649,370 | 3/1987 | Thomason . |
| 4,757,300 | 7/1988 | Sebalos ........................... 188/1.11 |
| 4,800,991 | 1/1989 | Miller ............................. 188/1.11 |
| 4,855,712 | 8/1989 | Wiley, Jr. et al. ................ 340/453 |
| 4,883,150 | 11/1989 | Arai . |
| 4,989,537 | 2/1991 | Hutchinson, Sr. et al. ........ 116/208 |
| 5,044,302 | 9/1991 | Goldfein et al. . |
| 5,140,932 | 8/1992 | Goldfein et al. . |
| 5,178,092 | 1/1993 | Schedin . |
| 5,213,056 | 5/1993 | Nicholls et al. . |
| 5,226,509 | 7/1993 | Smith . |
| 5,253,735 | 10/1993 | Larson et al. ..................... 188/1.11 |
| 5,285,190 | 2/1994 | Humphreys et al. ............. 188/1.11 |
| 5,339,069 | 8/1994 | Penner et al. .................... 116/208 |
| 5,358,075 | 10/1994 | Jarzombek . |
| 5,392,691 | 2/1995 | Schultz ............................ 92/63 |

FOREIGN PATENT DOCUMENTS

| | | | |
|---|---|---|---|
| 1245190 | 7/1967 | Germany ........................ 116/208 |
| 62-286816 | 12/1987 | Japan . |
| 63-255114 | 10/1988 | Japan . |
| 1282835 | 7/1972 | United Kingdom ............. 92/5 R |
| 1302928 | 1/1973 | United Kingdom ............. 188/1.11 |
| 2232770 | 12/1990 | United Kingdom . |

*Primary Examiner*—Douglas C. Butler
*Attorney, Agent, or Firm*—Howard & Howard

[57] ABSTRACT

Electronic stroke indicators have sensor structures which are incorporated into a stone shield for a brake actuator. The incorporation of the sensor into the stone shield protects the sensor and its associated wires and contacts from damage by the other components in the brake actuator. In particular, the spring is typically maintained out of contact with any of the electric portions of the electronic stroke indicator, thus prolonging the life of the electronic stroke indicator. In further features of this invention, a magnetic sensor may monitor the position of magnetic portions on a piston rod. Alternatively, a pair of electric contact switches may be serially contacted by a structure on the piston rod as the brake moves further out of stroke. The two electric contacts provided different signals to an operator in a vehicle cab such that signals of the level of out-of-stroke conditions are provided to the operator. In a further embodiment, a load cell monitors the compression in a spring in the brake housing to provide an indication of an out-of-stroke condition.

9 Claims, 2 Drawing Sheets

HEAVY DUTY ELECTRONIC BRAKE STROKE INDICATOR

BACKGROUND OF THE INVENTION

This application in general relates to an electronic stroke indicator which is incorporated into the cylinder housing of a brake actuator in such a way that it is protected from damage from the other components in the brake actuator.

After routine wear, brake actuators typically begin to require adjustment, and may have an undue amount of stroke. In such a condition it is said the brake is out-of-stroke. The prior art has attempted to give warnings to operators of the vehicle when the brakes need adjustment. The indicators which have been incorporated into production units have typically been visual indicators. Thus, an indicator such as a colored stripe which should typically not be visual unless the brake is out-of-stroke is placed on the piston rod.

An operator would periodically check the brake, and if the colored stripe is visible, the operator would have a signal that the brake requires adjustment. Such indicators, while quite valuable could still be improved. First, an indicator that requires visual identification positioned in the neighborhood of the brake is often exposed to mud or dirt. Thus, the visual indicator may not be readily visible. In addition, the visible indicators are typically positioned at the rear of the vehicle. An operator must periodically leave the vehicle to check the brakes. This requires the operator to perform periodic checks in order to insure that the brake does not become too far out of stroke.

Several electronic stroke indicators have been proposed, although they have not been widely utilized in production brake or brake actuators. Typically, these units are incorporated onto a piston rod and monitor the stroke of the piston or the piston rod. When an undue amount of stroke is sensed, a signal is sent to an operator in the vehicle cab. While these proposed systems do address the deficiencies in visual indicators, there have not been systems proposed which would be practically utilizable. The interior of the brake chamber includes a number of components which move relative to each other. The proposed systems have typically included sensors within the chamber, in a location where they are likely to be damaged by other components. As one example, the sensors in a proposed system are placed in the service brake chamber, in the general location of the spring. There has been no attempt to protect the delicate sensor and associated wires from being contacted by the spring and being damaged. A necessary component of reliance on any electronic stroke indicator is a stroke indicator system which is reliable and operable for a relatively long period of time. The prior art systems which have not adequately protected the sensor and associated wires may not be as reliable as would be desirable.

Other proposed sensors include indicators which are mounted on the piston rod outwardly of the chamber away from the spring. The proposed units which have indicators mounted on the piston rod outwardly of the chamber have not necessarily solidly connected the indicator or the sensor to structure at a fixed location. As an example, in one proposed system, the sensor is mounted on a rod adjacent to the piston rod. An indicator is mounted on the piston rod. When the sensor or indicator units on the piston rod are not at fixed locations, the reliability of any out-of-stroke indication from the sensor is in question. This problem is made more severe since the outside area of the brake chamber is in a hostile environment exposed to dirt, rocks and other debris. Such debris could contact the sensor, damaging the sensor, or misaligning the position of the various members. Again, the environment that the brake is disposed in is hostile, and a sensor placed outside of the brake chamber may not always function properly.

Thus, the prior art systems have been unable to provide a sensor system which is protected from the operative elements of the brake, and which may be relied upon to operate for a relatively long period of time.

SUMMARY OF THE INVENTION

This invention includes a sensor which is incorporated into a stone shield in the brake chamber housing. The stone shield protects the sensor from contacting other operative components of the brake actuator. As an example, the stone shield will protect the sensor from contact by the spring.

In a disclosed embodiment of this invention, the stone shield is positioned about the piston rod in the brake chamber housing. The shield incorporates part of a sensor unit for determining an out-of-stroke condition of a brake actuator. In a preferred embodiment of this invention, the stone shield which has a bore at an inner peripheral surface extending radially inwardly from the inner peripheral surface of a bore in the nominal brake housing. The stone shield functions to surround the piston rod and limit the amount of debris which may enter into the brake chamber housing from the bore in the brake housing.

In preferred embodiments of this invention, a wire is incorporated into the stone shield leading from the sensor outwardly of the housing. The wire is protected from the spring, which is typically found in the chamber housing, by the stone shield.

In a first preferred embodiment of this invention, a sensor is embedded into the stone shield, as are electric contact rings. A retainer for holding the stone shield within the housing has contacts which mate with contact rings in the stone shield. Wires lead from those contacts to a location outwardly of the housing.

In a second preferred embodiment a Hall Effect sensor is embedded into the stone shield, when the stone shield is molded. A lip at the outer peripheral surface of the stone shield receives the brake chamber spring such that the spring is maintained in a position where the spring will not be likely to contact any of the wires of the sensor system.

In a third preferred embodiment, the stone shield incorporates a pair of contact switches, with a first inner contact switch actuating a first warning indicator as the brake begins to approach an out-of-stroke condition. When a second contact switch contacts the structure on the piston, a second indicator light would typically be actuated which would give a warning that the brake is now fully out of stroke.

In this third preferred embodiment, a contact member is preferably mounted on the piston rod and has a contact portion extending radially outwardly from the outer surface of the piston rod. The contact switches are formed at circumferentially spaced positions on the stone shield, and extend to varying heights to provide the two stroke indication levels.

In a fourth preferred embodiment of this invention, a load cell sensor is incorporated into the stone shield to monitor the compression in the spring. As the brake approaches an out-of-stroke condition, the piston moves beyond its normal position, thus compressing the spring beyond typical compression. This is sensed by the load cell which then provides a signal to the operator that the brake is approaching an out-of-stroke condition.

These and other features of the present invention can be best understood from the following specifications and drawings, of which the following is a brief description.

DETAILED DESCRIPTION OF THE PREFERRED EMBODIMENT

Figure 1:
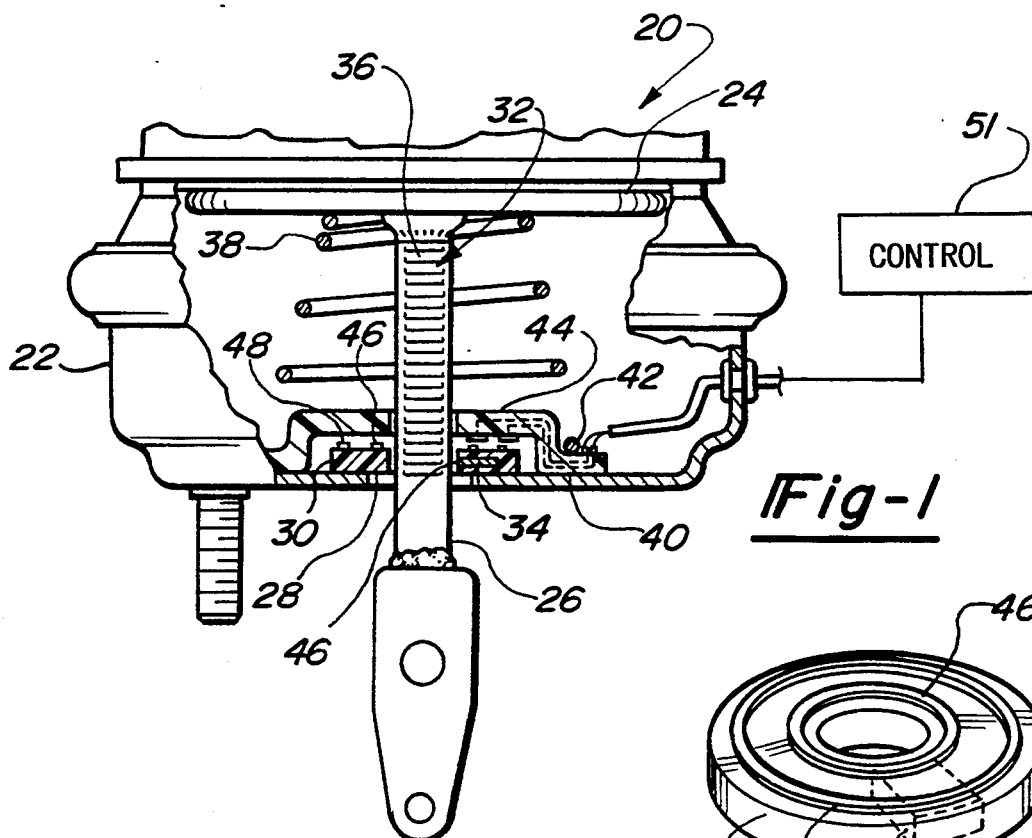
FIG. 1 is a cross-sectional view through a first embodiment stroke indicator according to the present invention.

FIG. 1 shows a spring brake actuator 20, having a service side housing 22. As shown, a piston 24 moves with a piston rod 26 through an opening 28 in the housing 22. As also shown, a stone shield 30 has an inner peripheral bore 32 extending radially inwardly from the innermost extent of bore 28. Stone shield 30 functions to limit the amount of dirt or debris which may enter the chamber of the housing 22.

A sensor 34 is embedded into the stone shield 28, and monitors the position of a magnetic tape 36 molded onto piston rod 26. By monitoring the position of magnetic tape 36, sensor 34 can determine if there is an undue amount of stroke, thus indicating that the brake needs readjustment. A spring 38 abuts piston 24 at one end, and abuts a stone shield retainer 40 at an opposed end. An outer radial surface 42 of retainer 40 receives spring 38. Retainer 40 includes a radially inner portion 44, which extends axially and then radially inwardly from the outer portion 40. Contacts in inner portion 44 connect to contact rings 46 and 48 in stone shield 30. The contact rings 46 and 48 connecting through the contacts provide an electric circuit from sensor 34 to a wire 50 extending outwardly of the housing. Wire 50 is connected to an appropriate control 51 to provide a signal to an operator in the vehicle cab when an out-of-stroke condition is sensed. Such indication can be a light, an audio warning, or any other known or typical warning signal.

Figure 2A:
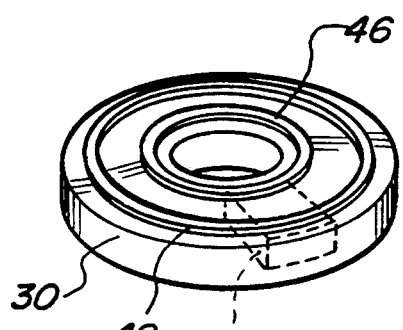
FIG. 2A is a perspective view of one portion of the stroke indicator illustrated in FIG. 1.

As shown in FIG. 2A, a stone shield 30 incorporates a sensor 34 which is embedded into the molded stone shield over a portion of its circumferential extent. Contact rings 46 and 48 preferably extend around the entire circumference of the stone shield 30.

Figure 2B:
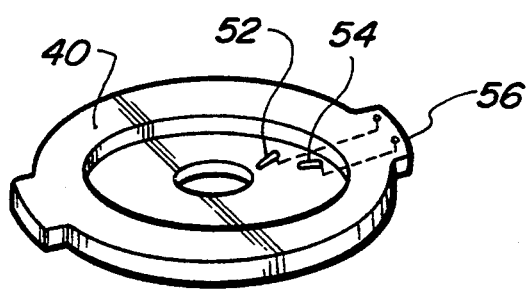
FIG. 2B is a perspective view of a second portion of the stroke indicator shown in FIG. 1.

FIG. 2B shows a detail of the retainer 40. A contact strip 52 is radially aligned with the location of contact ring 46 and a second contact strip 54 is radially aligned with contact ring 48. Contacts strips 52 and 54 are each connected to electrical connections 56, which are connected to wire 50. Since contact rings 46 and 48 extend around the entire circumference of the stone shield 30, the relative circumferential relationships of the retainer 40 and the stone shield 30 need not be carefully monitored. Rather, whatever the circumferential relationship, the contact strips 52 and 54 will contact the rings 46 and 48, respectively, thus providing electrical connection from the sensor 34 to the wire 50, and thus to control 51.

Figure 3:
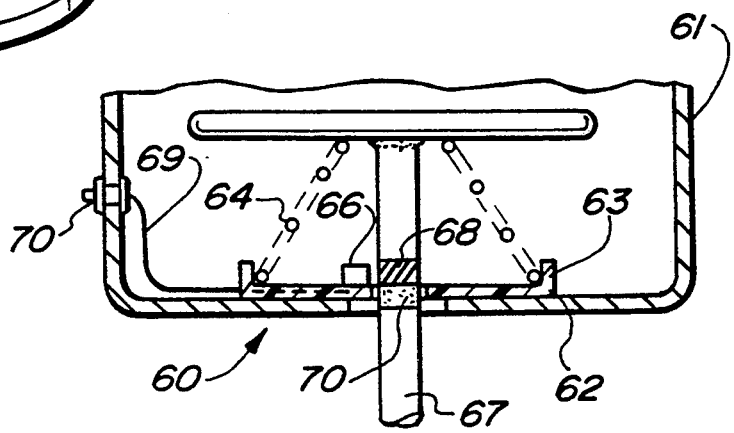
FIG. 3 is a cross-sectional view through a second embodiment stroke indicator.

FIG. 3 shows a second embodiment electronic stoke indicator 60. In electronic stroke indicator 60, a single stone shield 62 incorporates a radially outer lip 63 holding an end of spring 64. A Hall Effect switch 66 is embedded into the molded stone shield 62 and monitors the stroke of a piston rod 67. As shown, piston rod 67 incorporates a magnetic tape portion 68, and a nonmagnetic section 70. The Hall Effect switch can sense as the portion 68 approaches, and can provide a signal of an out-of-stroke condition. Switch 66 is connected by an embedded wire 65 to wire 69 which leads from stone shield 62 outwardly through an opening 70 in the brake housing 61. Lip 63 provides an assurance that spring 64 is maintained at a position where it is unlikely to contact wire 69. Thus, wire 69 is protected from damage from the spring 64.

Figure 4:
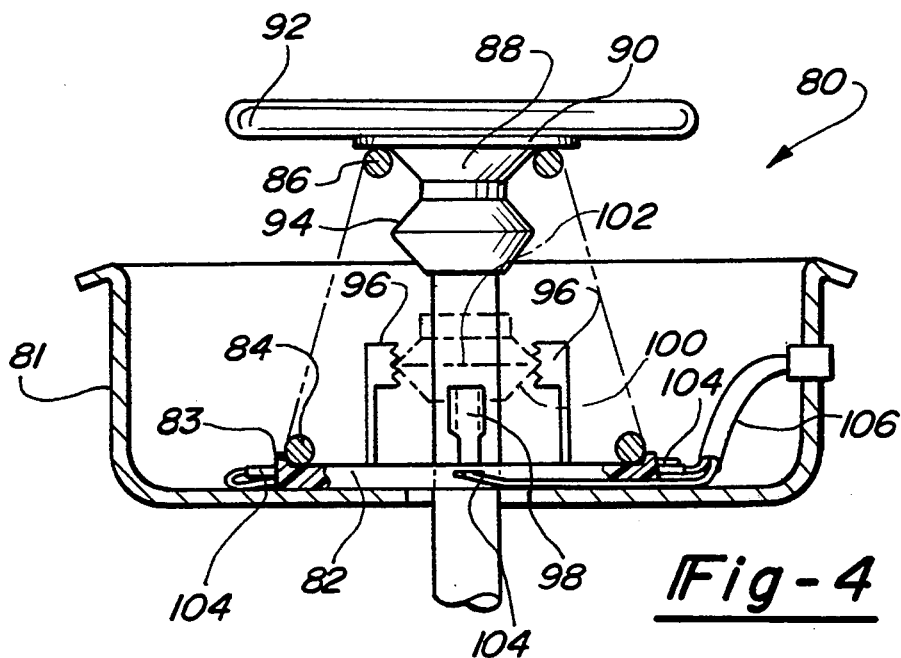
FIG. 4 is a cross-sectional view through a third embodiment stroke indicator.

As shown in FIG. 4, a third embodiment indicator 80 incorporates a stone shield 82 also having a radially outer lip 83 catching a spring 84. A radially inner end 86 of the spring 84 abuts piston contact member 88 having an end face 90 abutting piston 92. An outer contact portion 94 extends radially outwardly from surrounding portions of contact member 88. A first set of contact switches 96 is positioned on stone shield 82 at an axially inner location and a second set of contact switches 98 is positioned on stone shield 82 at a relatively axially outer location. An inner peripheral surface 100 on contact switches 96 and 98 is formed jagged to ensure a good connection between the contact switches 96 and 98 and the contact portion 94 when it is at a location such as shown in phantom at 102. Contact plugs 104 are connected to each contact switch 96 and 98 through an embedded connector and extend outwardly of the stone shield 82. The contact plugs 104 are connect through a wire 106 to extend outwardly of the housing 81 through a plug member 108. The base of shield 82 is preferably a non-conductive plastic. The contact switches are preferably steel or other conductive material. Again, lip 83 insures that spring 84 is unlikely to contact any of the contact members 104, or wire 106.

In operation, as the piston approaches an out-of-stroke condition, contact portion 94 will initially contact the first set of contact switches 96. This may be at 80 percent of the stroke. A signal would then be provided to the operator in the vehicle, such as described above. As the brake moves more out-of-stroke, portion 94 will eventually approach the second set of contact switches 98. At that time, a second more urgent signal will preferably be given. As an example, switch 96 may actuate a yellow light whereas switch 98 may actuate a red light and an audio warning. By providing the two indicators, one gives an operator advance notice that the brake actuator is approaching a condition that requires adjustment.

Figure 5:
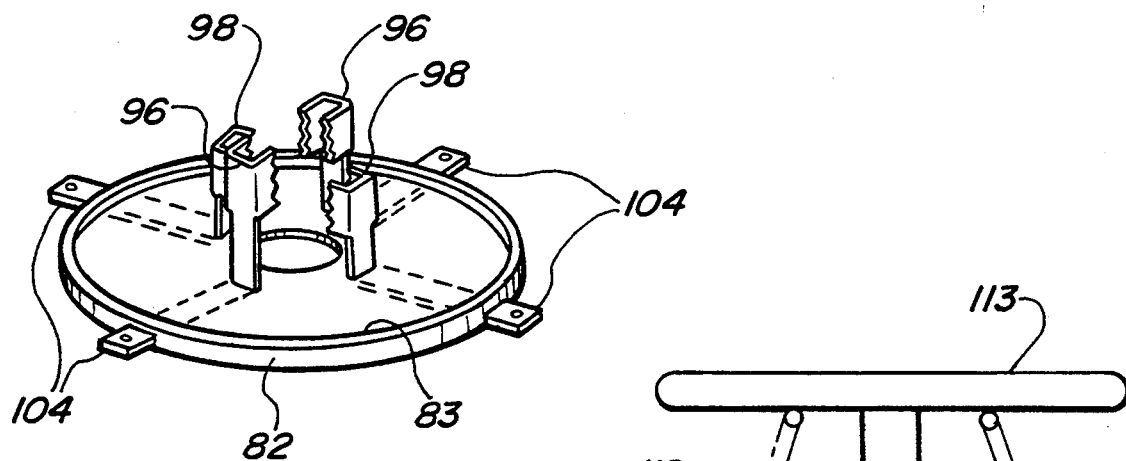
FIG. 5 is a perspective view of a portion of the embodiment shown in FIG. 4.

As shown in FIG. 5, stone shield 82 incorporates lip 83, and contact plugs 104 connected with each contact switch 96 and 98 by embedded portions 105. The contact 96 and 98 are preferably circumferentially spaced.

Figure 6:
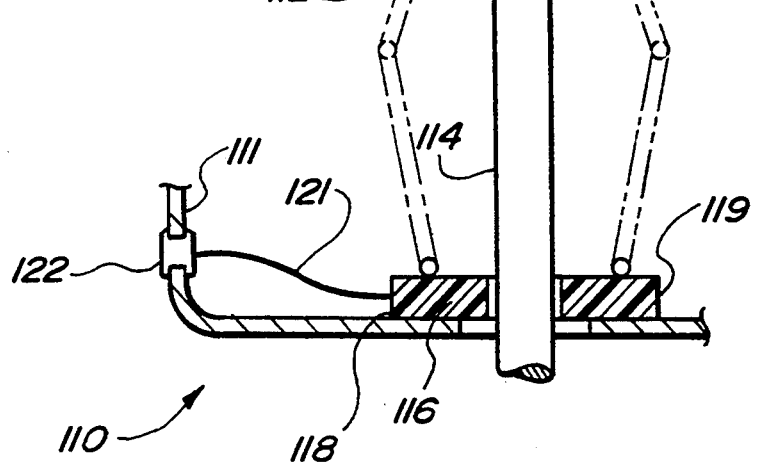
FIG. 6 is a cross-sectional view through a fourth embodiment stroke indicator according to the present invention.

FIG. 6 shows a fourth embodiment electronic stroke indicator 110 incorporated into the housing 111 of a brake actuator. Again, a spring 112 contacts a piston 113 having a piston rod 114 extending through a stone shield 116. In the instant case, the stone shield is incorporated into the bore 118 of the housing 111. Embedded into the stone shield 116 is a load cell 119, shown schematically. The load cell monitors the amount of compression in spring 112. As the piston 113 approaches an out-of-stroke condition, the compression in spring 112 increases. Load cell 119 senses such undue compression and is connected through an embedded wire to provide a signal through wire 120. If compression beyond a preset limit is sensed, a warning is sent. Wire 120 is molded into an end surface 121 of the housing 111, and extends outwardly through a plug 122 in the outer wall of end wall 121. Thus, when the load cell 119 senses undue stress in spring 112 a signal is sent to the operator.

The stone shields can be made of any material which is suitable for the function of the stone shield. Preferably, a non-conductive material which may be molded to have the embedded sensors and electrical connections utilized. Tough plastics would be suitable materials. The sensor elements themselves and the other electronics are all known electronic components.

The several embodiments all have in common that the sensor units are somehow incorporated into a stone shield member to protect the sensitive sensor elements from the other components in the brake, and in particular the spring. Due to the incorporation of the electronics into the stone shield, a sensor unit is typically provided with a long operating life. In addition, the units also are operatable to provide indications of levels of out-of-stroke condition, as well as monitoring the load in the spring, which provides a good indication of an out-of-stroke condition.

Although preferred embodiments of this invention have been disclosed, a worker of ordinary skill in the art would recognize that certain modifications would come within the scope of this invention. For that reason the following claims should be studied in order to determine the true scope and content of this invention.

We claim:

1. A brake actuator with a sensor system to sense exclusive required movement of a push rod to actuate an associate brake comprising:
    a housing having a bore;
    a piston received within said housing and having the piston rod extending through said bore, a magnetic stroke indicating member carried by said piston rod;
    a stone shield having an inner bore surrounding said piston rod, said piston rod extending through said bore in said stone shield, said bore in said stone shield having a smaller inner diameter than said housing bore; and said stone shield having an outer periphery and a sensor embedded in said stone shield between said outer periphery and said inner bore, said sensor monitoring the stroke of said piston rod by monitoring movement of said stroke indicating member on the piston rod, and said sensor being capable of sensing movement of said magnetic member on said piston rod, said sensor being embedded in said stone shield such that it is capable of monitoring movement of said magnetic member on said piston rod, the movement of said magnetic member on said piston rod being indicative of the movement of said piston, and hence undue movement of said piston being sensed by said sensor.

2. A stone shield as recited in claim 1, wherein a lip extends axially into said housing from said stone shield, a spring biases said piston into said housing, and an end of such spring is received radially inwardly of said lip, to be held by said lip.

3. A brake actuator as recited in claim 1, wherein said sensor is a magnetic sensor, and a contact connected to said sensor is embedded in said sensor and extends through said stone shield and outwardly of said housing, said contact being connected to a control to provide a signal to an operator in a vehicle cab when an out-of-stroke condition is sensed.

4. A brake actuator as recited in claim 3, wherein said magnetic sensor is a Hall Effect switch.

5. A brake actuator as recited in claim 3, wherein a magnetic strip is placed on said piston rod, and said magnetic sensor monitors the position of said magnetic strip to determine an out-of-stroke condition.

6. A brake actuator as recited in claim 1, wherein said stone shield incorporates a first member receiving said sensor, and a retainer retaining said stone shield within said brake housing, there being an electrical connection between said sensor and a wire leading from said retainer.

7. A brake actuator as recited in claim 6, wherein one of said stone shield and said retainer incorporates a contact ring extending over the entire circumferential extent of said one of said stone shield and said retainer, and the other of said stone shield and said retainer including a contact extending over a limited circumferential extent.

8. A brake actuator as recited in claim 1, wherein said sensor includes a contact embedded in said stone shield and extending radially outwardly through said brake housing, and a spring being disposed between said stone shield and said piston and biasing said piston into said housing, said contact extending radially outwardly of said stone shield such that said spring is unlikely to contact said wire.

9. A brake actuator as recited in claim 1, wherein said magnetic member on said piston rod may move through said inner bore in said stone shield.

* * * * *

UNITED STATES PATENT AND TRADEMARK OFFICE
CERTIFICATE OF CORRECTION

PATENT NO. : 5,450,930
DATED : September 19, 1995
INVENTOR(S) : Timothy F. Martens, Robert J. Hicks, Robert J. Hilding It is certified that error appears in the above-indentified patent and that said Letters Patent is hereby corrected as shown below:

Claim 1, column 5, line 48 delete "exclusive" and insert --excessive-- therefor.

Signed and Sealed this

Twenty-seventh Day of February, 1996

Attest:

BRUCE LEHMAN

Attesting Officer      Commissioner of Patents and Trademarks